(12) United States Patent
Mercado Diez et al.

(10) Patent No.: US 8,713,859 B2
(45) Date of Patent: May 6, 2014

(54) ADVANCED SYSTEM TO IMPROVE THE INSTALLATION OF WIRE-CLIMBING LIFTING DEVICES ON HOLLOW TOWERS

(71) Applicant: Norvento Energia Distribuida, S.L., Lugo (ES)

(72) Inventors: Luis Ignacio Mercado Diez, Madrid (ES); Jose Miquel Hoyos Irisarri, Madrid (ES)

(73) Assignee: Norvento Energia Distribuida, S.L., Lugo (ES)

( * ) Notice: Subject to any disclaimer, the term of this patent is extended or adjusted under 35 U.S.C. 154(b) by 0 days.

(21) Appl. No.: 13/772,077

(22) Filed: Feb. 20, 2013

(65) Prior Publication Data

US 2013/0219805 A1    Aug. 29, 2013

(30) Foreign Application Priority Data

Feb. 27, 2012 (EP) ..................................... 12382068

(51) Int. Cl.
   *E04H 12/34* (2006.01)
(52) U.S. Cl.
   USPC ....................................................... 52/126.3
(58) Field of Classification Search
   USPC .................. 52/40, 123.1, 126.3, 651.02, 843; 116/173
   See application file for complete search history.

(56) References Cited

U.S. PATENT DOCUMENTS

| | | | | |
|---|---|---|---|---|
| 1,064,200 A * | 6/1913 | Engblom | ....................... | 119/789 |
| 2,613,915 A * | 10/1952 | Stone | .......................... | 254/93 R |
| 3,670,159 A * | 6/1972 | Millerbernd | ....................... | 200/2 |
| 3,911,267 A * | 10/1975 | Kiehn | .......................... | 362/282 |
| 4,051,525 A * | 9/1977 | Kelly | ............................. | 348/143 |
| 5,454,202 A * | 10/1995 | van der Weijden | ........ | 40/606.09 |
| 6,614,125 B2 * | 9/2003 | Willis et al. | ...................... | 290/55 |
| 6,758,159 B2 * | 7/2004 | McCudden et al. | .......... | 116/173 |
| 7,530,325 B2 * | 5/2009 | Swenson et al. | .............. | 116/173 |
| 2004/0084664 A1 * | 5/2004 | Ash | ............................... | 254/338 |
| 2011/0192340 A1 * | 8/2011 | Somers | ......................... | 116/173 |

FOREIGN PATENT DOCUMENTS

AU       782 024 B2    6/2005

OTHER PUBLICATIONS

European Search Report issued in Application No. 12 38 2068, dated Sep. 28, 2012, 6 pages.

* cited by examiner

*Primary Examiner* — Christine T Cajilig
(74) *Attorney, Agent, or Firm* — Arent Fox LLP

(57) ABSTRACT

An advanced system for the installation of wire-climbing lifting devices on hollow towers is presented. This system allows two positions easily alternated by the operator of the installation: a resting position, in which the wires (5) are hidden inside the tower (1) and a maintaining position in which wires (5) are safely set up outside the tower (1) to allow a lifting device climbing on them. At the resting position the wire terminals are at ground level so the operators are able to inspect the conditions of them before their use and the safety of the system is improved.

4 Claims, 2 Drawing Sheets

ADVANCED SYSTEM TO IMPROVE THE INSTALLATION OF WIRE-CLIMBING LIFTING DEVICES ON HOLLOW TOWERS

BACKGROUND ART

Hollow towers are used in many different applications, as for instance wind energy converters, meteorological masts, telecommunication towers, lamp posts, watch towers or lighthouses.

In many cases, in these applications it is necessary to foresee a system which allows reaching the upper part of the tower, for operation or maintenance reasons.

The simplest system for this aim is a ladder attached to the tower, either internally or externally. However, in higher towers this solution can be inadequate, due to the effort necessary to climb to the top of the tower and the safety issues involved. On the other hand, outer ladders have a bad effect on the installation aesthetics, and internal ladders need additional lighting equipment.

In very large towers, an internal lift is a common solution, although the space required inside the tower and the cost of the installation makes it unaffordable for medium size towers.

There are also "medium size" installations where ladders are not convenient whether an internal lift is technically unfeasible and/or economically unaffordable. In these installations, a common solution is the use of lifting devices which are able to climb on wires arranged on the outer side of the tower and supported on it.

In the simplest version of this solution, the wires are permanently in their working position, hanging from a support at the tower top. The advantage is that not movable parts are used and the operators do not have to prepare the installation for using the lifting device. However, this option is not always possible due to the normal operation of the installation, for instance in wind turbines, where the wires can interfere with the rotor blades turning. On the other hand, a disadvantage of keeping the wires outside of the tower permanently is that they are exposed to corrosion and other environment aggressions, as well as vandalism acts. Additionally if the wires are placed outside they can affect the aesthetics of the installation, a fact which can be important in places with especial restrictions on this regard.

Another option is to set up a system which allows removing or hiding the wires while the lifting device is not being used. To do so, a pulley can be installed on the top of the tower, which allows lowering the wires when the lifting device has to be installed, and lifting them up to the pulley when the works have been finished. These operations have to be carried out from the ground, thus even in resting position, half of the length of the wires will be still visible and exposed to the environment, since they cannot be lifted beyond the pulley. Furthermore this system enforces the pulley and its support to withstand double of the load of the lifting device, due to the forces balance.

SUMMARY OF THE INVENTION

The present invention relates to an advanced system to improve the installation of wire-climbing lifting devices on hollow towers that makes possible to overcome the disadvantages disclosed. The system of the invention allows keeping the structural wires inside the hollow towers while the lifting device is not being used, as well as avoiding the use of a pulley and reducing the structural requirements for the wires support on the top of the tower.

The system comprises a structural support from which the wires used by the lifting device are hung and a pass-through device, which are placed at the top of the tower in the outside in fixed positions. The system comprises a turning roll fixed to the ground or to the tower, which is placed in the inside of the tower. These are the fixed parts of the system.

Furthermore the system comprises wires, to allow the lifting device to climb through them, wire terminals, a rope and a counterweight. Said elements are movable between a resting position and a maintenance position of the system. The wires have the wire terminals in one of their ends and the counterweight in the other end. The wires are in the inside of the tower in the resting position and outside the tower in the maintaining position, using the pass-through device to go from the inside to the outside of the tower.

The lifting device needs two wires to climb because one of them is the working wire and the other is the safety wire.

BRIEF DESCRIPTIONS OF THE DRAWINGS

FIG. 1a shows a detail of top part of the tower, being the system at the resting position.

FIG. 1b shows a detail of the low part of the tower, being the system at the resting position.

FIG. 2a shows a detail of top part of the tower, being the system at the maintenance position.

REFERENCES

Figure 1:
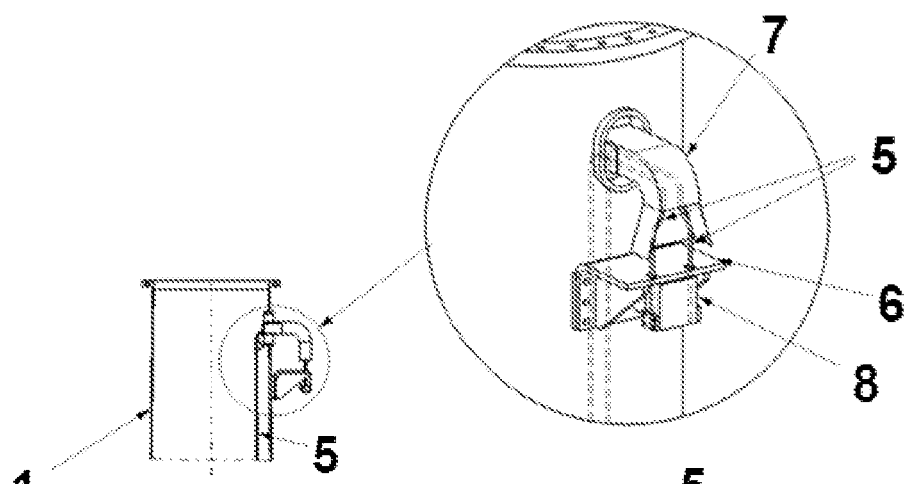
FIG. 1 shows the system of the invention in the resting position.
Figure 1:
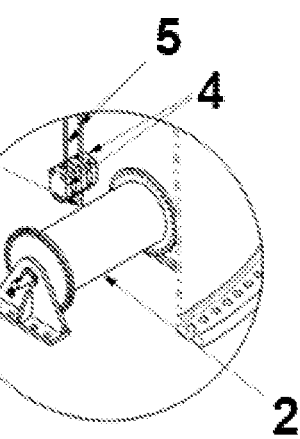

1: Tower; 2: Turning roll; 3: Rope; 4: Wire terminals; 5: Wires, 6: Structural support; 7: Pass-through device; 8: Counterweight

DETAILED DESCRIPTION OF THE INVENTION

The advanced system to improve the installation of wire-climbing lifting devices on hollow towers of the present invention is designed to allow keeping the elements in the inside of the hollow tower (1) while they are not being used. This is the resting position of the system. The system comprises a rope (3), a turning roll and two wires (5) (a working wire and a security wire). One end of the wires (5) is placed inside of the tower (1) and is linked to wire terminals (4) while the other end of the wires (5) is placed outside of the tower (1) and is linked to a counterweight (8). The pass of the wires (5) from the inside to the outside is made with a pass-through device (7) which is placed at the top of the tower (1). The tower can have the pass-through device (7) as part of it.

The turning roll (2) is fixed to the ground or to the base of the tower (1). At the resting position of the system, the rope (3) is completely rolled around the turning roll. The length of the rope (3) is slightly longer than the height of the tower (1). The rope is attached to the wire terminals (4) as can be appreciated in FIG. 1.

The system comprises a structural support (6) which is placed outside the tower (1) close to the pass-through device (7). At the resting position, the counterweight (8) which is linked to one of the ends of the wires (5) rests in direct contact with the structural support (6) as can be appreciated in FIG. 1.

At the resting position, the wire terminals (4) remain at the ground level so the operators are able to inspect the conditions of them before their use.

Figure 2:
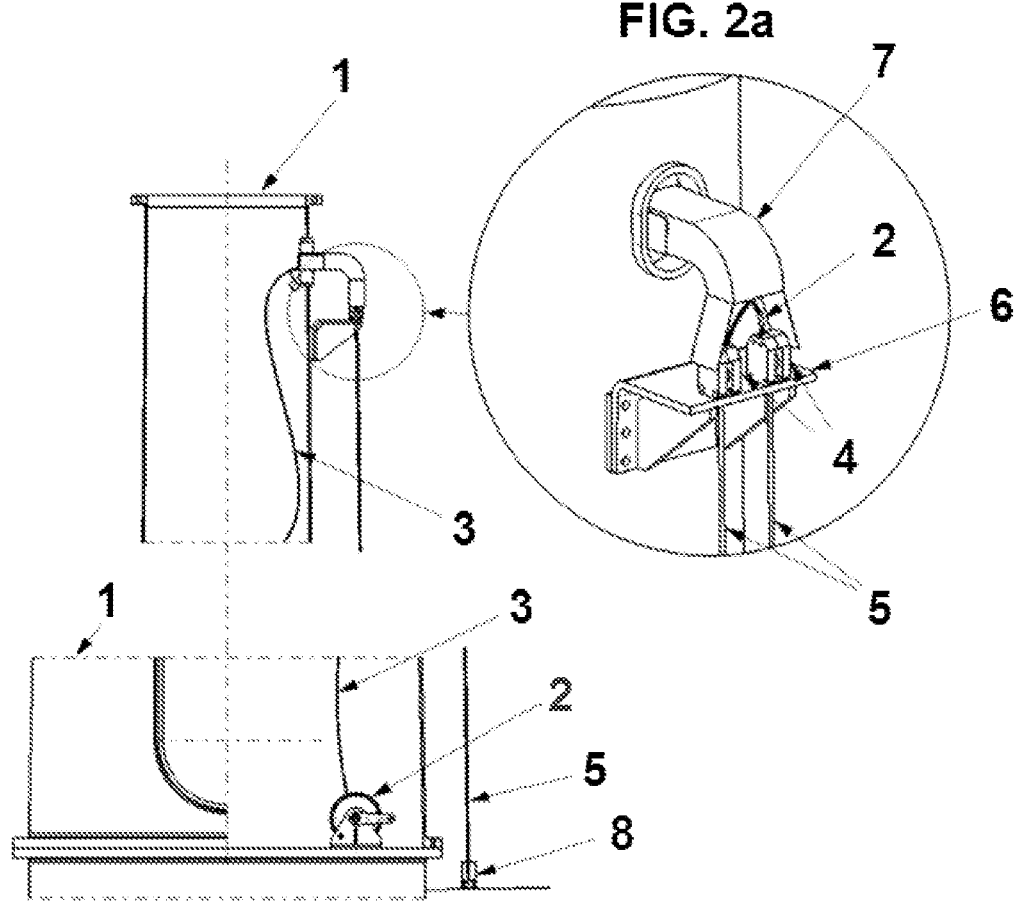
FIG. 2 shows the system of the invention in the maintenance position.

When it is necessary to realize maintenance operations the operators release the turning roll (2) so the counterweight (8) get to the ground outside the tower (1) as can be appreciated in FIG. 2. The velocity of the fall is controlled by means of the turning roll (2) in which the rope (3) is rolled on.

The pass-through device (7) has an especial geometry designed to guide the set or sets of wire terminals (4) through it and let them reach the structural support (6) in the maintenance position. At the maintenance position the wire terminals (4) are in contact with the top surface of the structural support (6).

When the wire terminals (4) are in contact with the structural support (6), the weight of the wires (5) is supported by the structural support (6) and the rope (3) is no longer supporting forces. At that moment the wires (5) are ready to be used with the lifting device.

When the maintenance operations have been finished, the operating personnel use the turning roll (2), coiling the rope (3) on it and consequently lift the counterweight (8) to the top of the tower (1).

The invention claimed is:

1. A system for installing wires for a wire-climbing lifting device on a hollow tower, comprising:
    a fixed turning roll disposed inside a lower part of the hollow tower, which moves a rope linked to the turning roll when the turning roll is activated;
    a fixed pass-through device which is disposed outside a top of the hollow tower;
    a fixed structural support disposed near the pass-through device outside the hollow tower;
    a wire for the wire-climbing lifting device to climb, the wire having a first end and a second end;
    a wire terminal linked to the first end of the wire and linked to the rope; and
    a counterweight linked to the second end of the wire;
    wherein in a resting position the rope is completely rolled around the turning roll, the wire is disposed within the hollow tower, the wire terminal is at ground level, and the counterweight is in contact with a bottom surface of the structural support, and
    wherein in a maintenance position the rope is unrolled from the turning roll, the wire is disposed outside the hollow tower, the wire terminal is in contact with a top surface of the structural support, the counterweight is at the ground level, and the wire-climbing lifting device is attachable to the wire.

2. The system according to claim 1, wherein the pass-through device and the structural support are a single piece configured to act as a supporting surface for the wire terminal in the maintenance position.

3. The system according to claim 1, wherein the structural support extends from an outer surface of the hollow tower in a direction away from the outer surface of the hollow tower.

4. The system of claim 1,
    wherein the pass-through device communicates with a outlet formed in an outer surface of the hollow tower, and
    wherein the structural support is disposed at a distance from the outlet.

* * * * *

UNITED STATES PATENT AND TRADEMARK OFFICE
CERTIFICATE OF CORRECTION

PATENT NO. : 8,713,859 B2
APPLICATION NO. : 13/772077
DATED : May 6, 2014
INVENTOR(S) : Luis Ignacio Mercado Diez et al.

It is certified that error appears in the above-identified patent and that said Letters Patent is hereby corrected as shown below:

Title Page

Item (72) Inventors:
        ~~Luis Ignacio Mercado Diez, Madrid (ES); Jose Miquel Hoyos Irisarri, Madrid (ES)~~ should read as:

Item (72) Inventors:
        Luis Ignacio Mercado Diez, Madrid (ES); Jose Miguel Hoyos Irisarri, Madrid (ES)

Signed and Sealed this
Twenty-ninth Day of July, 2014

Michelle K. Lee
*Deputy Director of the United States Patent and Trademark Office*